(12) United States Patent
Erdogan

(10) Patent No.: US 12,202,241 B2
(45) Date of Patent: Jan. 21, 2025

(54) SURFACE VEIL AND SURFACE FILM INTEGRATED PREPREG LAYER AND PROCESSES FOR MAKING THE SAME

(71) Applicant: KORDSA TEKNIK TEKSTIL A.S., Kocaeli (AR)

(72) Inventor: Elif Erdogan, Kocaeli (TR)

(73) Assignee: KORDSA TEKNIK TEKSTIL A.S., Kocaeli (TR)

( * ) Notice: Subject to any disclaimer, the term of this patent is extended or adjusted under 35 U.S.C. 154(b) by 239 days.

(21) Appl. No.: 17/834,953

(22) Filed: Jun. 8, 2022

(65) Prior Publication Data

US 2022/0340725 A1 Oct. 27, 2022
US 2024/0391207 A9 Nov. 28, 2024

Related U.S. Application Data

(62) Division of application No. 16/958,966, filed as application No. PCT/TR2018/050807 on Dec. 14, 2018, now Pat. No. 11,772,357.

(30) Foreign Application Priority Data

Dec. 28, 2017 (TR) ............................... 2017/22409

(51) Int. Cl.
| | |
|---|---|
| B32B 5/12 | (2006.01) |
| B29B 15/10 | (2006.01) |
| B29C 65/00 | (2006.01) |
| B32B 5/02 | (2006.01) |
| B32B 27/08 | (2006.01) |
| B32B 27/10 | (2006.01) |
| B32B 27/12 | (2006.01) |
| B32B 27/18 | (2006.01) |
| B32B 27/36 | (2006.01) |
| B32B 27/38 | (2006.01) |
| B32B 37/10 | (2006.01) |
| B32B 38/08 | (2006.01) |
| C08J 5/04 | (2006.01) |
| C08J 5/24 | (2006.01) |
| C08K 3/36 | (2006.01) |
| C08K 5/315 | (2006.01) |
| C08L 9/02 | (2006.01) |
| C08L 63/00 | (2006.01) |

(52) U.S. Cl.
CPC ............ *B32B 5/12* (2013.01); *B29B 15/10* (2013.01); *B29C 65/00* (2013.01); *B32B 5/024* (2013.01); *B32B 27/08* (2013.01); *B32B 27/10* (2013.01); *B32B 27/12* (2013.01); *B32B 27/18* (2013.01); *B32B 27/36* (2013.01); *B32B 27/38* (2013.01); *B32B 37/10* (2013.01); *B32B 38/08* (2013.01); *C08J 5/042* (2013.01); *C08J 5/043* (2013.01); *C08J 5/046* (2013.01); *C08J 5/24* (2013.01); *C08L 63/00* (2013.01); *B32B 2260/021* (2013.01); *B32B 2260/046* (2013.01); *B32B 2262/0223* (2013.01); *B32B 2262/0253* (2013.01); *B32B 2262/0261* (2013.01); *B32B 2264/0214* (2013.01); *B32B 2274/00* (2013.01); *B32B 2305/076* (2013.01); *B32B 2305/08* (2013.01); *B32B 2305/188* (2013.01); *B32B 2307/51* (2013.01); *B32B 2307/514* (2013.01); *C08J 2363/00* (2013.01); *C08K 3/36* (2013.01); *C08K 5/3155* (2013.01); *C08L 9/02* (2013.01); *C08L 2207/53* (2013.01)

(58) Field of Classification Search
CPC ..................................................... B32B 5/022
See application file for complete search history.

(56) References Cited

U.S. PATENT DOCUMENTS

| | | | | |
|---|---|---|---|---|
| 2010/0163275 A1* | 7/2010 | Hiel | ........................ | B32B 27/08 |
| | | | | 428/377 |
| 2010/0166998 A1* | 7/2010 | Bannister | ............ | B29C 66/1122 |
| | | | | 264/510 |
| 2014/0262011 A1* | 9/2014 | Lewit | .................... | B29B 15/127 |
| | | | | 156/280 |

(Continued)

FOREIGN PATENT DOCUMENTS

| | | | | |
|---|---|---|---|---|
| EP | 2607401 A1 * | 6/2013 | ............. | B29C 44/02 |
| GB | 2447964 A * | 10/2008 | ......... | B29C 63/0021 |

(Continued)

OTHER PUBLICATIONS

Machine translation WO 2005/83002 A1 (Year: 2005).*

*Primary Examiner* — Jacob T Minskey
*Assistant Examiner* — Wayne K. Swier
(74) *Attorney, Agent, or Firm* — Bayramoglu Law Offices LLC

(57) ABSTRACT

A ready to use surface veil and surface film integrated prepreg layer suitable to use in a production of lightweight structural parts/panels with class A surfaces includes a curable bottom base resin formulation including a curable bottom base resin, at least one first toughening agent, at least one accelerator, at least one curing agent and at least one hardener. The prepreg layer further includes a release paper coated with the curable bottom base resin formulation to obtained curable bottom base resin formulation coated release paper as a first resin film; a reinforcement fabric; an outer resin formulation including an outer resin, wherein the outer resin is the curable bottom base resin being 10% more viscous than a resin, at least one thermoplastic toughening agent, at least one accelerator, at least one curing agent and at least one hardener agent.

14 Claims, No Drawings

(56) References Cited

U.S. PATENT DOCUMENTS

| | | | |
|---|---|---|---|
| 2016/0082691 A1* | 3/2016 | Restuccia | B32B 5/00 |
| | | | 442/379 |
| 2016/0152819 A1* | 6/2016 | Balijepalli | C08J 3/247 |
| | | | 523/400 |
| 2016/0185072 A1* | 6/2016 | Wielander | B32B 5/10 |
| | | | 428/107 |

FOREIGN PATENT DOCUMENTS

| | | | | |
|---|---|---|---|---|
| GB | 2448951 A | * | 11/2008 | ......... B29C 63/0021 |
| WO | WO-2005083002 A1 | * | 9/2005 | ............. B32B 27/08 |
| WO | WO-2017021147 A1 | * | 2/2017 | ........... B29C 70/083 |

* cited by examiner

SURFACE VEIL AND SURFACE FILM INTEGRATED PREPREG LAYER AND PROCESSES FOR MAKING THE SAME

CROSS-REFERENCE TO THE RELATED APPLICATIONS

This application is a divisional application of U.S. patent application Ser. No. 16/958,966, filed on Jun. 29, 2020, which is the national stage entry of International Application No. PCT/TR2018/050807, filed on Dec. 14, 2018, which is based upon and claims priority to Turkish Patent Application No. 2017/22409, filed on Dec. 28, 2017, the entire contents of which are incorporated herein by reference.

TECHNICAL FIELD

Present invention is related with a ready to use surface veil and surface film integrated prepreg layer which is suitable to use in the production of lightweight structural parts/panels with class A surfaces and processes for making the same.

BACKGROUND

In the recent years, need for fiber reinforced polymer composites to be used in industrial applications such as automotive, aerospace and marine applications and also in wind turbine industries have increased due to their well-documented advantages over traditional construction materials, like metals and steel. However, fiber reinforced composite materials often suffer from their rough and pinholed surface properties; therefore, they could not fulfill the expectation. Thus, to meet requirements, "Class A" surface finish is needed. In automotive design, a Class A surface is any of a set of freeform surfaces of high efficiency and quality. Class A surface may be used in a variety of applications including contoured panels in automobiles, aircraft, and the like. In conventional circumstances, the Class A surface is achieved by the use of the "surface veil/mat," and an optional film overlying the veil, that is added to the side of the layup where the Class A surface is to be formed.

A film is applied over the veil in accordance with the prior art. In this case, the materials that provide structural strength to the part are molded twice, while the material that provides the Class A surface is only molded once. Optionally, the veil may be molded first and then consolidated with the reinforcing layers. So, it requires double-work and is time consuming.

Veils and mats are manufactured from non-wovens fibers or short-chopped fibers, a small amount of chemical binder and, in some cases, additional particulates or fillers. They possess equal strength in all directions. They may be made of polyester fibers, glass fibers, carbon fibers, aramid fibers, cotton fibers, mixtures of these fibers and any other fiber that can withstand the consolidation and cure temperature.

There are two types of films which are commonly used in the field. One of them is dry films that are thermoplastic, thermosetting, or elastomeric films and other commercially available films. Second one is wet films which are selected from resinous coatings or gel-coats. The resinous coatings and gel-coats may be applied to either the surface of the mold or to the reinforcements. The gel-coats may be selected from any gel-coat that is compatible with the resin matrix of the prepreg. Briefly gel is coated onto the inner side of the mold and then to form a gel layer before the prepreg layers not assembled onto the gel layer prior to curing. During final cure process, the prepreg matrix and gel coat becomes compatible and gives further reaction, this generally resulting in a desired A Class surface to the formed composite. However, the cure process is very labour intensive requiring an initial curing step and tends to produce a gel layer with unevenly distributed thickness on the surface and results in undesirable weight increase. Moreover, the gel-coat includes fillers. While processing, it is needed to warm up the mold in order to provide better tackiness to the surfacing film. However, this temperature increase results in viscosity decrease of the resin causing filler accumulation on the mold. After curing of the material, the surface of the composite material is not smooth and comprises deformations which can vary from small pin-holes to cracks which can transform into crack growth during product life cycle. These surfaces may need to be repaired which is an inefficient and expensive way of part production.

The number and the construction of the reinforcing layers depend on the load to which the part/panel will be subjected. The structural parts may be prepared with a resin matrix selected from any one or more of a wide variety of thermosetting resins. In prior art, resin matrix is also proposed to be both thermoplastic and thermosetting resin. If the gel coat matrix resin is a thermoplastic, when the prepreg bases are laminated onto the first thermoplastic surface, there will be slippage on each other due to the free of tackiness of thermoplastic resin at room temperature. This causes a large variation in fiber orientation among the structure, large thickness deviations and poor mechanical properties of the part. During manufacturing of especially large parts, it may require to part one to another part of the production. So, very low viscosity/high tackiness of the gel coat restricts handle ability of the mold.

SUMMARY

The present invention provides a ready to use surface veil and surface film integrated prepreg layer which is suitable to use in the production of lightweight structural parts/panels with class A surfaces comprises curable bottom base resin formulation comprising curable bottom base resin, at least one first toughening agent, at least one accelerator, at least one curing agent and at least one hardener. The prepreg layer further comprises a release paper that is coated with curable bottom base resin formulation to obtained curable bottom base resin formulation coated release paper as a first resin film; a reinforcement fabric; an outer resin formulation comprising outer resin which is curable bottom base resin being 10% more viscous than the resin, at least one thermoplastic toughening agent, at least one accelerator, at least one curing agent and at least one hardener agent. The prepreg layer also comprises a second resin film that is coated with the outer resin formulation which is called as first surfacing film and a surface veil.

The present invention also provides a method for producing a ready to use surface veil and surface film integrated prepreg layer which is suitable to use in the production of lightweight structural parts/panels with class A surfaces comprises the steps of: obtaining a curable bottom base resin formulation by mixing curable bottom base resin, the first toughening agent, at least one accelerator, at least one curing agent and at least one hardener by heating the curable bottom base resin to 70° C. in a container while stirring by a mixer; coating a first release paper that have an areal weight of 5 to 250 g/m² with curable bottom base resin formulation and obtaining a curable bottom base resin formulation coated release paper as a first resin film; impregnating the first resin film onto at least one side of a reinforcement fabric at a temperature in the range of from 40° C. to 110° C. to obtain a prepreg layer; obtaining curable bottom base resin being 10% more viscous than the resin by dispersing the thermoplastic toughening agent in the curable bottom base resin by a mechanical mixer at 120° C. for 2 hours in a suitable container; adding at least one accelerator, at least one curing agent and at least one hardener agent to the curable bottom base resin being 10% more viscous than the resin and heating to 70° C. in said container while stirring by a mixer to obtain an outer resin formulation; coating a second release paper that have an areal weight of 35 to 150 g/m² with outer resin formulation and obtaining an outer resin formulation coated release paper as second resin film; impregnating the second resin film onto a surface veil that have an areal weight of 35 to 150 g/m² to obtain a second resin film impregnated surface veil; impregnating the second resin film impregnated surface veil onto at least one other side of the reinforcement fabric; pressing the reinforcement fabric, impregnated by the first resin film on one side, and second resin film impregnated surface veil on the other side, to obtain surface veil and surface film integrated prepreg layer.

The present invention provides a ready to use surface veil and surface film integrated prepreg layer which is suitable to use in the production of lightweight structural parts/panels with class A surfaces for enhancing the appearance and masking the reinforcing fiber imperfections and for providing better resin transportation medium. Also present invention provides a cost and time saving method to produce a ready to use surface veil and surface film integrated prepreg layer.

One of the objects of the invention is to provide a ready to use surface veil and surface film integrated prepreg layer which is suitable to use in the production of lightweight structural parts/panels with class A surfaces.

One of the objects of the invention is to provide a method for producing a ready to use surface veil and surface film integrated prepreg layer which is suitable to use in the production of lightweight structural parts/panels with class A surfaces.

One of the objects of the invention is to provide a method for producing a ready to use surface veil and surface film integrated prepreg layer to obtain a Class A surface in a cost and time saving way.

One of the objects of the invention is to provide a ready to use surface veil and surface film integrated prepreg layer for enhancing the appearance and masking the reinforcing fiber imperfections.

Other object of the invention is to provide a ready to use surface veil and surface film integrated prepreg layer for providing better resin transportation medium.

DETAILED DESCRIPTION OF THE EMBODIMENTS

In the recent years, need for fiber reinforced polymer composites to be used in industrial applications has increased. However, fiber reinforced composite materials often fails to meet the needs because of their rough and pinholed surface properties. Thus, to meet requirements, "Class A" surface finish is needed. Even Class A surfaces offer great amount of advantages, the methods and compositions in the prior art for making these surfaces are inadequate as they are time and cost consuming. Moreover they are very labour intensive requiring and tend to produce unevenly distributed thickness on the surface and results in undesirable weight increase. Therefore, a ready to use surface veil and surface film integrated prepreg layer which is suitable to use in the production of lightweight structural parts/panels with class A surfaces and processes for making the same are provided by the present invention.

The present invention provides a ready to use surface veil and surface film integrated prepreg layer which is suitable to use in the production of lightweight structural parts/panels with class A surfaces comprises curable bottom base resin formulation comprising curable bottom base resin (preferably thermosetting resin, more preferably epoxy resin and most preferably bisphenol A resin), at least one first toughening agent (preferably thermoplastic toughening agent), at least one accelerator, at least one curing agent and. The prepreg layer further comprises a release paper that is coated with curable bottom base resin formulation to obtained curable bottom base resin formulation coated release paper as a first resin film; a reinforcement fabric; an outer resin formulation comprising outer resin which is curable bottom base resin being 10% more viscous than the resin, at least one thermoplastic toughening agent (preferably thermoplastic toughening agent), at least one accelerator, at least one curing agent and at least one hardener agent. The prepreg layer also comprises a second resin film that is coated with the outer resin formulation which is called as first surfacing film and a surface veil.

In preferred embodiment of the prepreg layer according to present invention, the second resin film is impregnated onto the surface veil. Preferably, one side of the reinforcement fabric is impregnated with the first resin film and one other side of the reinforcement fabric is impregnated with the second resin film impregnated surface veil.

The present invention provides a method for producing a ready to use surface veil and surface film integrated prepreg layer which is suitable to use in the production of lightweight structural parts/panels with class A surfaces comprises the steps of:

obtaining a curable bottom base resin formulation by mixing curable bottom base resin, the first toughening agent, at least one accelerator, at least one curing agent and at least one hardener by heating the curable bottom base resin to 70° C. in a container while stirring by a mixer; coating a first release paper that have an areal weight of 5 to 250 g/m² (more preferably 60 to 150 g/m² and most preferably 80 to 120 g/m²) with curable bottom base resin formulation and obtaining a curable bottom base resin formulation coated release paper as a first resin film;

impregnating the first resin film onto at least one side of a reinforcement fabric (unidirectional/woven) at a temperature in the range of from 40° C. to 110° C. (preferably 60° C. to 80° C.) to obtain a prepreg layer;

obtaining curable bottom base resin being 10% more viscous than the resin by dispersing the thermoplastic toughening agent in the curable bottom base resin by a mechanical mixer at 120° C. for 2 hours in a suitable container;

adding at least one accelerator, at least one curing agent and at least one hardener agent to the curable bottom base resin being 10% more viscous than the resin and heating to 70° C. in said container while stirring preferably by a mechanical mixer to obtain an outer resin formulation;

coating a second release paper that have an areal weight of 35 to 150 g/m² (more preferably 60 to 300 g/m² and most preferably 80 to 140 g/m²) with outer resin formulation and obtaining an outer resin formulation coated release paper as second resin film;

impregnating the second resin film onto a surface veil that have an areal weight of 35 to 150 g/m² (more preferably 60 to 120 g/m² and most preferably about 40 to 80 g/m²) to obtain a second resin film impregnated surface veil;

preferably at least one side of the external surface of the outer resin formulation impregnated surface veil layer is coated with a second resin film at a temperature in the range of from 40° C. to 110° C. (preferably 60° C. to 80° C.);

impregnating the second resin film impregnated surface veil onto at least one other side of the reinforcement fabric;

pressing reinforcement fabric, impregnated by the first resin film on one side, and second resin film impregnated surface veil on the other side to obtain surface veil and resin film integrated prepreg layer.

In a preferred embodiment of the prepreg layer according to present invention, reinforcement fabric is made of carbon fiber, glass fiber, organic fibers (preferably aramid fiber, poly(p-phenylene benzobisoxazole) fiber, polyethylene fiber, and polyvinyl alcohol fiber), and combinations of these fibers. Preferably reinforcement fabric is unidirectional (UD), with the individual filaments aligned substantially parallel, or weaved fabric.

In a preferred embodiment of the prepreg layer according to present invention, the first toughening agent is selected from the group comprising core shell rubber (CSR), nitrile butadiene rubber (NBR) and silica. All the toughening agents are sold dispersed in epoxy. Toughening agents is used to make the formulation tougher and get a higher viscosity.

In an alternative embodiment of the prepreg layer according to present invention; the outer resin and/or curable bottom base resin is selected from the group comprising thermoplastic resins, thermosetting resins, and their combinations. Most preferably, thermosetting resin is epoxy resins with preferably has an Epoxy Equivalent Weight (EEW) in the range from 110 to 600 preferably a high reactivity such as an EEW in the range of from 150 to 400. Epoxy resins preferably comprise blends of two or more epoxy resins selected from monofunctional, difunctional, trifunctional and/or tetrafunctional epoxy resins. In a preferred embodiment the same epoxy resin is used in each of the layers. Thanks to the tackiness of the outer resin layer and curable bottom base resin of the ready to use prepreg layer, at room temperature, the lay-up and laminating is convenient. So, the tackiness drawback of resins is not an issue.

In an alternative embodiment of the prepreg layer according to present invention, difunctional epoxy resin are selected from the group comprising diglycidyl ether of bisphenol F, diglycidyl ether of bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof. In a preferred embodiment, hot melt suitable toughened epoxies are preferred.

In another alternative embodiment of the prepreg layer according to present invention, trifunctional epoxy resins are selected from the group comprising phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof.

In one other alternative embodiment of the prepreg layer according to present invention, tetrafunctional epoxy resins are selected from the group comprising N,N, N',N'-tetraglycidyl-m-xylenediamine and N,N,N',N'-tetraglycidylmethylenedianiline.

In other alternative embodiment of the prepreg layer, the outer resin formulation and/or curable bottom base resin formulation comprises preferably epoxy resin, urea based curing agents and it is preferred to use from 0.5 to 10 wt % based on the weight of the epoxy resin of a curing agent, more preferably 1 to 8 wt %, more preferably 2 to 8 wt %. In the present invention latent amine-based curing agent, most preferably dicyanopolyamide (DICY), is used as accelerator. The resin in the outer resin formulation and curable bottom base resin formulation is preferably a matrix resin (preferably thermosetting resin) in order to have good drape property at room temperature In one embodiment of the invention the outer resin formulation and curable bottom base resin formulation preferably have a viscosity of 1×106 Pa·s or less at room temperature (25° C.). Thanks to the viscosity in this range, these resins can serve to produce an uppermost prepreg outer resin layer with intended tackiness and drape property.

In the present invention the surface veil and surface film integrated prepreg layer is provided. Thanks to this integrated structure, air venting surface structure is provided. Also handling of the resin impregnated reinforcement fabric is facilitated. The embossed film coated surface behaves like channels for air venting and help the air to escape. Using a surface veil in which the interior of the tows of the resin impregnated reinforcement fabric is at least partially resin free provides an air venting path or structure, so that air that presented in the tows of the impregnated reinforcement fabric is not trapped within the structure by the resin and escape during preparation and consolidation of the structure.

In an alternative embodiment of the present invention the viscosity of the resin and the conditions employed for impregnation are selected to enable the desired degree of impregnation. It is preferred that the complex viscosity ($\eta^*$) of the system is between 1000-10000 poises ($0.9 \leq G'/\eta^*$ (Pa/Pa s)$\leq 1.1$) at 50° C. The processing temperature is increased so that the viscosity of the resin can be decreased and impregnation level increased. The complex viscosity of the resin formulations is between 40 to 60 poise at 65° C. Preferably, the resin formulations have a complex viscosity of from 1×106 Pa to 2×106 Pa·s. More preferably from 5 to 30 Pa·s at 80° C. It is preferred that the resin content of the prepregs is such that after curing the structure contains from 30 to 42 wt %, preferably 31 to 40 wt % more preferably 32 to 37 wt % of the resin. The useful cure temperature range is between 60° C.-150° C. and the cure time of the resin can be customized by the used accelerator type and amount.

In one embodiment of the invention, A glass transition temperature Tg after 1 hour of curing at 120° C. in the range of from 110 to 160° C., preferably from 120 to 145° C. The viscosity of the curable bottom base resin formulation and/or outer resin formulation ($\eta^*$) is preferably below 0.5 poise at the beginning (t=0) of cure temperature (150° C.). The viscosity of the resins ($\eta^*$) is preferably higher >104 poise at the end of 150 seconds (t=150) of cure temperature (150° C.). The prepreg assembly is cured preferably vacuum bag, or autoclave cure or press cure.

In one other embodiment of the invention, the weight per unit area of the reinforcing fabric is preferably in the range of 80 to 600 g/m$^2$, more preferably 140 to 500 g/m$^2$, and the most preferably 200 to 400 g/m$^2$.

In a preferred embodiment of the method according to present invention a vacuum is applied in the pressing step in order to reduce void content and release air bubbles, around the material prior to compressing.

In preferred embodiment of the method according to present invention, the system for carrying out the process has two separate production lines, namely film production and prepreg production lines. This system comprises a outer resin coated roll, a curable base resin roll, an outer resin impregnated surface veil roll, a non-coated (empty) release liner roll, UD or weaved fabric roll, compaction rolls, a bottom resin holder, a film holder, empty roll, an infrared heater, a bottom resin coating unit, an upper resin coating unit, a fabric feeding system, prepreg production machine and a control panel of the system. Accordingly, the outer resin coated roll is loaded onto the bottom resin holder on the prepreg production line and the non-coated (empty) release liner (25 m) is lied on the related path on the line till the surface of the empty roll at the end of the prepregging line. This empty roll is used to wrap the surfacing film (preferably PE film)—surface veil-outer resin-release sandwich at the end of the process. The lied non-coated release paper roll's beginning section is attached onto the surface of the empty roll via a cold- and tear-resistant tape. The surfacing veil is loaded onto the film holder just before the infrared heater on the prepregging line. The infrared heater is preferably adjusted to 5-10% to heat the surfacing veil and remove the air. The preferably thicknesses, temperature and pressure values are set via the control panel system. The upper resin coating unit is loaded with surfacing film preferably embossed PE film. The film is laid through the line and it is also attached onto the empty roll to be wrapped. The impregnation is achieved via the compaction rolls and temperature (60-100° C., and more preferably 85° C.). The outer resin impregnated surface veil is wrapped onto the empty roll. This outer resin impregnated surface veil is used as the upper coating of the prepreg layer. The outer resin impregnated surface veil roll is loaded onto the upper resin coating unit of the prepreg production line. The curable base resin roll that was produced at the beginning of the manufacturing process, is loaded onto the bottom resin coating unit of the prepreg production machine. In a further embodiment, the UD or weaved fabric roll is loaded onto the fabric feeding system on the prepreg production line. The required gaps and temperature values are adjusted via the control panel of the system. The base resin, reinforcement fabric and the outer resin coated surface veil are combined and pressed together so that the resin from the bottom and upper directions can partially enter into the fiber tows.

The present invention provides a ready to use surface veil and surface film integrated prepreg layer which is suitable to use in the production of lightweight structural parts/panels with class A surfaces for enhancing the appearance and masking the reinforcing fiber imperfections and for providing better resin transportation medium. Also present invention provides a cost and time saving method to produce a ready to use surface veil and surface film integrated prepreg layer.

What is claimed is:

1. A method for producing a ready to use surface veil and surface film integrated prepreg layer, wherein the method is suitable to use in a production of lightweight structural parts/panels with class A surfaces, and the method comprises the following steps of:
    obtaining a curable bottom base resin formulation by mixing a curable bottom base resin, a first toughening agent, at least one accelerator, at least one curing agent and at least one hardener agent by heating the curable bottom base resin to 70° C. in a container while stirring by a mixer;
    coating a first release paper having an areal weight of 5 to 250 g/m$^2$ with the curable bottom base resin formulation and obtaining a curable bottom base resin formulation coated release paper as a first resin film;
    impregnating the first resin film onto at least one side of a reinforcement fabric at a temperature in a range of from 40° C. to 110° C. to obtain a prepreg layer;
    obtaining the curable bottom base resin being 10% more viscous than a resin by dispersing a thermoplastic toughening agent in the curable bottom base resin by a mechanical mixer at 120° C. for 2 hours in a container;
    adding the at least one accelerator, the at least one curing agent and the at least one hardener agent to the curable bottom base resin being 10% more viscous than the resin and heating to 70° C. in the container while stirring by the mixer to obtain an outer resin formulation;
    coating a second release paper having an areal weight of 35 to 150 g/m$^2$ with the outer resin formulation and obtaining an outer resin formulation coated release paper as a second resin film;
    impregnating the second resin film onto a surface veil having an areal weight of 35 to 150 g/m$^2$ to obtain a second resin film impregnated surface veil;
    impregnating the second resin film impregnated surface veil onto at least one other side of the reinforcement fabric; and
    pressing the reinforcement fabric, impregnated by the first resin film on a first side, and the second resin film impregnated surface veil on a second side to obtain the surface veil and surface film integrated prepreg layer, wherein, in the obtained surface veil and surface film integrated prepreg layer, the reinforcement fabric is made of organic fibers and/or glass fibers and is at least partially resin free providing air venting paths.

2. The method according to claim 1, wherein a vacuum is applied in a pressing step.

3. The method according to claim 2, wherein at least one side of an external surface of the outer resin formulation impregnated surface veil prepreg layer is coated with the second resin film at a temperature in a range of from 40° C. to 110° C.

4. The method according to claim 3, wherein the at least one side of the external surface of the outer resin formulation impregnated surface veil prepreg layer is coated with the second resin film at a temperature in a range of from 60° C. to 80° C.

5. The method according to claim 2, wherein the mixer is the mechanical mixer.

6. The method according to claim 2, wherein an areal weight of the first release paper and/or the second release paper is 60 to 300 g/m$^2$.

7. The method according to claim 2, wherein an areal weight of the first release paper and/or the second release paper is 80 to 120 g/m$^2$.

8. The method according to claim 2, wherein the first resin film is impregnating onto the at least one side of the reinforcement fabric at a temperature in a range of from 60° C. to 80° C. to obtain the prepreg layer.

9. The method according to claim 2, wherein the second resin film is impregnated onto the surface veil having an areal weight of 60 to 120 g/m².

10. The method according to claim 2, wherein the second resin film is impregnated onto the surface veil having an areal weight of 40 to 80 g/m².

11. The method according to claim 1, wherein the thermoplastic toughening agent is nitrile butadiene rubber and/or core shell rubber.

12. The method according to claim 11, wherein the thermoplastic toughening agent is nitrile butadiene rubber.

13. The method according to claim 2, wherein the thermoplastic toughening agent is nitrile butadiene rubber and/or core shell rubber.

14. The method according to claim 13, wherein the thermos plastic toughening agent is nitrile butadiene rubber.

\* \* \* \* \*